(12) United States Patent
Scantlin et al.

(10) Patent No.: US 6,651,686 B2
(45) Date of Patent: Nov. 25, 2003

(54) VALVE ACTUATOR SYSTEM

(76) Inventors: Gary W. Scantlin, 2300 S. High Ave., Oklahoma City, OK (US) 73126; Charles P. Cravens, 2300 S. High Ave., Oklahoma City, OK (US) 73126

(\*) Notice: Subject to any disclaimer, the term of this patent is extended or adjusted under 35 U.S.C. 154(b) by 92 days.

(21) Appl. No.: 09/948,214

(22) Filed: Sep. 9, 2001

(65) Prior Publication Data

US 2003/0047214 A1 Mar. 13, 2003

(51) Int. Cl.$^7$ .................................................. G05D 7/01
(52) U.S. Cl. ........................ 137/70; 137/461; 137/463; 137/492.5
(58) Field of Search ................................ 137/461, 463, 137/492.5, 70

(56) References Cited

U.S. PATENT DOCUMENTS

| | | | | |
|---|---|---|---|---|
| 3,943,974 A | \* | 3/1976 | Connelly et al. | 137/624.27 |
| 4,325,406 A | \* | 4/1982 | Bron | 137/492.5 |
| 4,384,590 A | \* | 5/1983 | Friend | 137/102 |
| 5,080,129 A | \* | 1/1992 | Machat | 137/489 |
| 6,155,284 A | \* | 12/2000 | Scantlin | 137/70 |

\* cited by examiner

Primary Examiner—Stephen M. Hepperle
(74) Attorney, Agent, or Firm—Gary Peterson (57) ABSTRACT

An actuator system for a system valve exposable to a source of system pressure. A piston within a sensing vessel is caused to move longitudinally from a first position to a second position in response to a designated system pressure. A first piston stem carried by the piston is mechanically coupled to an actuator control valve, which is interposed in a fluid path between an actuator and a source of actuator pressure. Movement of the piston from its first to second position causes the coupled actuator control valve to block the fluid path linking the actuator and its pressure source, thereby causing a predetermined change in pressure at the actuator. As a result, the actuator shifts from its unactuated to its actuated state, thereby causing the system valve to shift from a first system valve position to a second system valve position.

16 Claims, 6 Drawing Sheets

VALVE ACTUATOR SYSTEM

FIELD OF THE INVENTION

The present invention relates generally to actuators for valves, and more particularly to control systems for such actuators.

SUMMARY OF THE INVENTION

The present invention comprises an actuator system for a system valve exposable to a source of system pressure. The system includes a sensing assembly, formed from a sensing vessel having a tubular internal cavity and a piston assembly. The piston assembly comprises a piston positioned within the internal cavity, the piston having at least a first position and a second position. The second position of the piston is longitudinally offset from the first position in a second direction. The piston assembly further comprises a piston control system adapted to move the piston from its first position to its second position in response to a designated system pressure.

The system further comprises an actuator, adapted for engagement with the system valve. The actuator has an unactuated state and an actuated state, and is adapted to shift from the unactuated state to the actuated state in response to a predetermined change in pressure at the actuator. The actuator is interconnectable with an actuator pressure source by an actuator fluid path.

An actuator control valve is interposed in the actuator fluid path. The actuator control valve is coupled to the piston, and produces the predetermined change in pressure at the actuator in response to movement of the piston from its first to its second position.

BRIEF DESCRIPTION OF THE DRAWINGS

FIG. 9 is a semi-schematic view of another embodiment of the actuator system of the present invention. The sensing vessel of the sensing assembly is shown in cross-section.

DETAILED DESCRIPTION OF THE INVENTION

Figure 1:
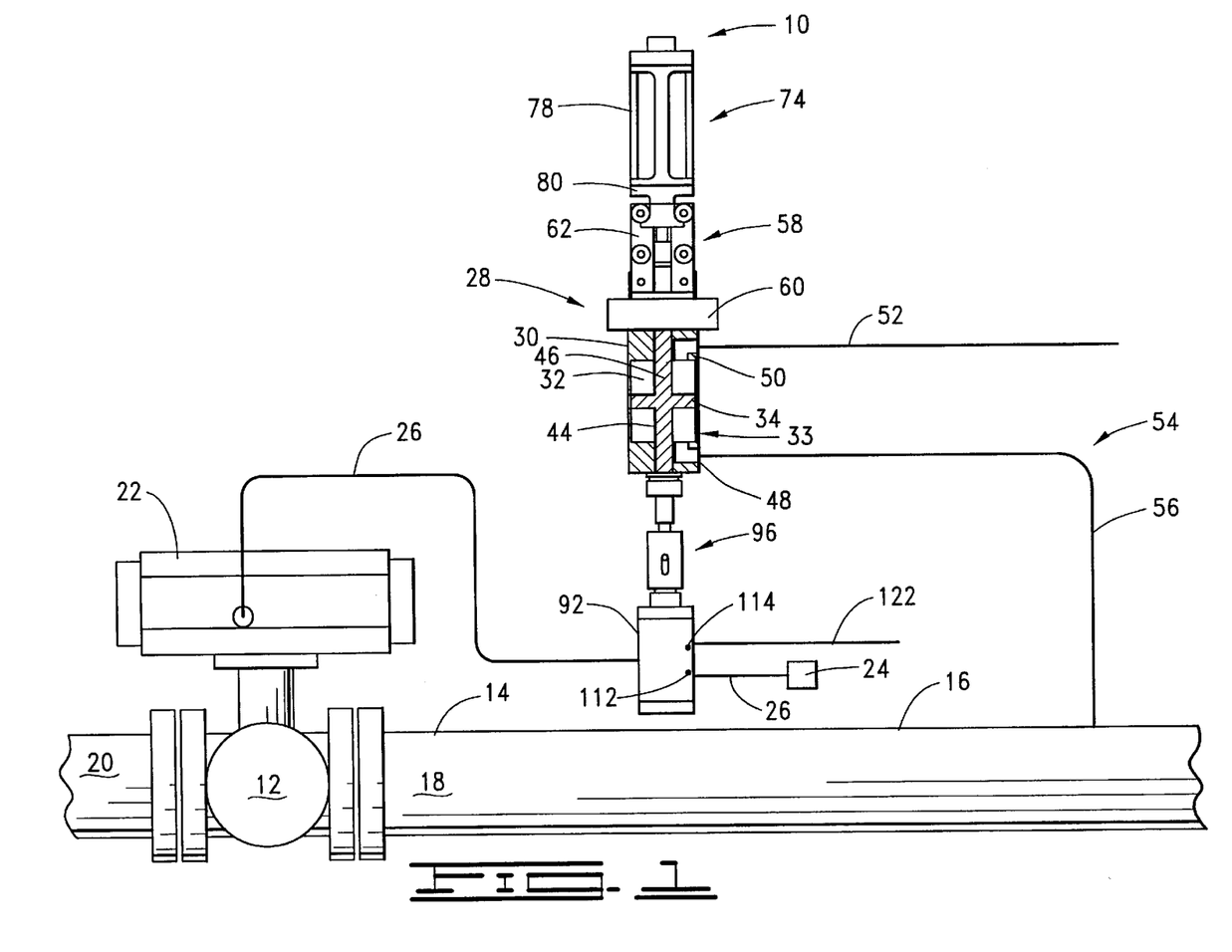
FIG. 1 is a semi-schematic view showing one embodiment of the actuator system of the present invention. The sensing vessel is shown in cross-section.

With reference to FIG. 1, the present invention comprises an actuator system 10 for a system valve 12 which is exposable to a source of system pressure 14, such as a pipeline 16. In one embodiment, the system valve 12 comprises a rotationally actuated valve, such as a ball valve, butterfly valve, plug valve or other quarter turn valve. The system valve 12 is interposed within pipeline 16 between an upstream position 18 and a downstream position 20. The system pressure to which the system valve 12 is exposed in this embodiment is the pressure within the pipeline 16 at the upstream position 18.

The present invention further comprises an actuator 22 which is adapted for engagement with the system valve 12. The actuator 22 is characterized by an unactuated state and an actuated state, and is adapted to shift from its unactuated state to its actuated state in response to a predetermined change in pressure at the actuator 22. For example, the actuator 22 may include a motive element, such as a piston or other sliding element, which is movable within a housing, such as a cylinder, from an unactuated position, corresponding to the unactuated state. to an actuated position, corresponding to the actuated state.

An internal biasing element, such as a spring or pressure reservoir, may be included in the actuator 22 in order to apply a directional force to the motive element. If unopposed, the directional force applied by the biasing element is capable of moving the motive element from its unactuated position to its actuated position. This biasing force may be overcome by applying an offsetting pressure against the motive element, preferably provided by an actuator pressure source 24.

The actuator pressure source 24 preferably comprises a source of fluid pressure, such as pneumatic pressure or hydraulic pressure. This source may comprise instrument air, which is available in many industrial settings, or a self-contained hydraulic power source. The actuator 22 is interconnectable with an actuator pressure source 24 by an actuator fluid path 26, which may comprise a pipeline or other fluid conduit.

When the actuator 22 and the actuator pressure source 24 are interconnected by actuator fluid path 26, the pressure at the actuator from the actuator pressure source 24 acts against the motive element of the actuator 22, and opposes and offsets the force applied by the biasing element to the motive element. As a result of this opposition, the motive element of the actuator 22 is maintained in its unactuated position.

In response to a predetermined change in pressure at the actuator 22, the motive element moves from its unactuated position to its actuated position. Such a predetermined change in pressure at the actuator may result from an interruption or obstruction in the actuator fluid path 26, or perhaps from a power failure which disables the actuator pressure source 24. After such a predetermined pressure change, the pressure opposing the biasing element is no longer sufficient to maintain the motive element in its unactuated position, and the motive element is moved to its actuated position.

The actuator 22 includes a coupling which interconnects the actuator 22 with the system valve 12. In response to transition of the actuator 22 from its unactuated state to its actuated state, this coupling causes the system valve 12 to shift from a first system valve position to a second system valve position. For example, the system valve 12 may be open in its first system valve position and closed in its second system valve position, or vice versa.

In many instances, the movement of the motive element of the actuator 22 will be a linear translational movement, whereas the system valve 12 is opened and closed by rotational movement of the stem. In this event, the coupling preferably comprises a crank or similar mechanism for converting the linear translational movement of the motive element to a rotary motion which can open, close or otherwise change the positioning of the system valve 12.

Figure 2:
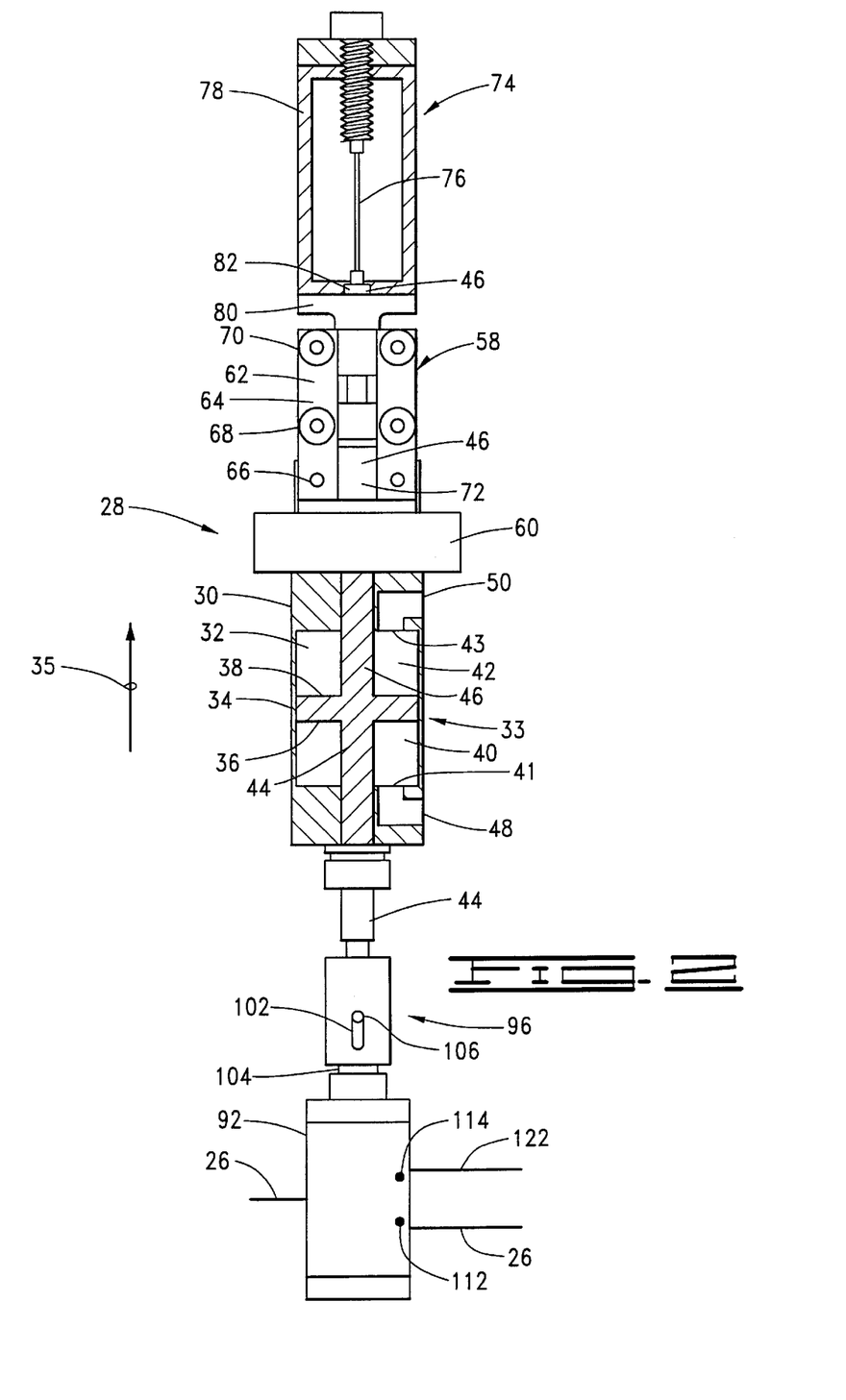
FIG. 2 is a side view showing the sensing assembly and the actuator control valve of the actuator system shown in FIG. 1, with the piston in its first position. The sensing vessel, the biasing element and its cage are shown in cross-section.

With reference to FIGS. 1 and 2, the system 10 of the present invention further comprises a sensing assembly 28 which monitors system pressure and mechanically responds to a designated system pressure. The sensing assembly 28 comprises an sensing vessel 30 having a longitudinal axis and opposed ends. The sensing vessel 30 is preferably cylindrical in shape, and is secured in a fixed position to a support surface (not shown) by a bracket or other connector (not shown).

The sensing vessel 30 is characterized by a tubular internal cavity 32 formed therein, also having a longitudinal axis and opposed ends. The internal cavity 32 is also preferably cylindrical in shape, and disposed in coaxial relationship with the sensing vessel 30. As best shown in FIG. 2, the sensing assembly 28 further comprises a piston assembly 33. The piston assembly 33 comprises a piston 34, positioned within the internal cavity 32, and movable along the longitudinal axis of the internal cavity 32. The piston 34 is characterized by a first side 36 and an opposed second side 38.

The piston 34 divides the internal cavity 32 into a first chamber 40 and a second chamber 42, with the first chamber 40 adjacent the first side 36 of the piston 34, and the second chamber 42 adjacent the second side 38 of the piston 34. The internal cavity 32 and piston 34 are provided with seals (not shown) in order to maintain substantially fluid-tight separation between the opposed first and second chambers 40 and 42.

The first chamber 40 is characterized by a first fluid inlet 41, which communicates by way of an internal channel formed in the sensing vessel 30 with a first external port 48. The second chamber 42 is similarly characterized by a second fluid inlet 43, which communicates by way of an internal channel with a second external port 50 formed in the sensing vessel 30.

As the piston 34 moves along the longitudinal axis of the internal cavity 32, the volume of one chamber increases, and the volume of its opposed chamber decreases. Fluid within the contracting chamber can be exhausted from the sensing vessel 30 by way of its fluid inlet and associated external port. In particular, as shown in FIG. 1, the second external port 50 is preferably connected to a chamber exhaust fluid path 52, such as a pipeline or other fluid conduit. The chamber exhaust fluid path 52 may be used to interconnect the contracting second chamber 42 with an exhaust muffler or speed control system (not shown).

The piston 34 is characterized by at least a first position and a second position, which is longitudinally offset in a second direction 35 from the first position. In the embodiment shown in FIGS. 1-3, the second direction 35 is upwards. The first position may correspond to the position of the piston 34 shown in FIG. 2, although any other longitudinal position for the piston 34 can also be selected as the first position, as dictated by system geometry and requirements.

Figure 3:
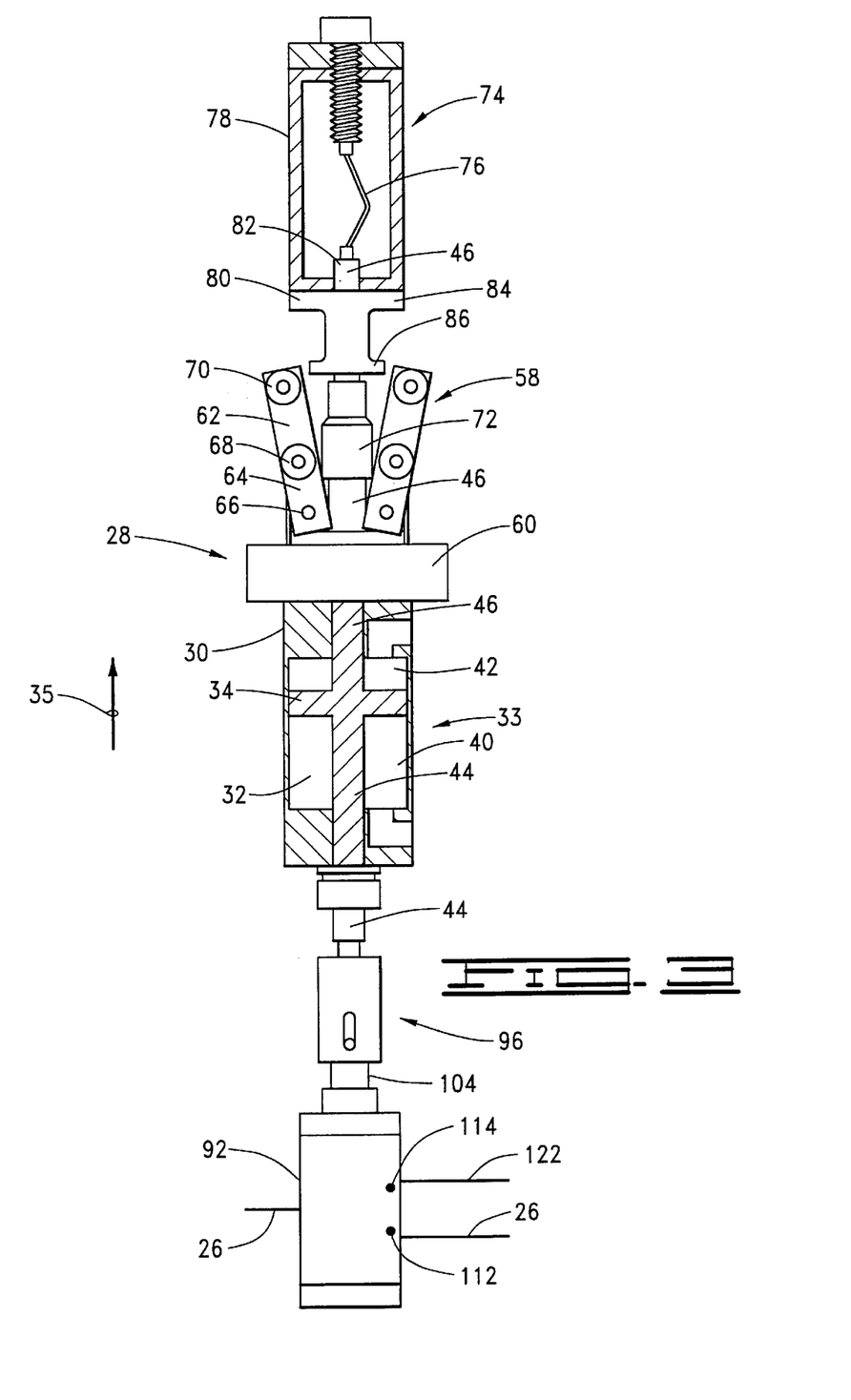
FIG. 3 is a side view of the same sensing assembly and actuator control valve shown in FIG. 2, in which the piston has shifted to its second position.

The longitudinally offset second position may correspond to the position of the piston 34 shown in FIG. 3, in which the volume of the second chamber 42 has been reduced, and the volume of the first chamber 40 has been expanded. Alternately, any other longitudinally offset position for the piston 34 can be selected as the second position, as dictated by system geometry and requirements.

The piston assembly 33 further comprises a first piston stem 44 engaged with the first side 36 of the piston 34 and extending longitudinally through the first chamber 40 and out the lower end of the sensing vessel 30. The piston assembly 33 preferably further comprises a second piston stem 46 engaged with the second side 38 of the piston 34 and extending longitudinally through the second chamber 42 and out the upper end of the sensing vessel 30. Seals (not shown) maintain a substantially fluid-tight seal between the piston stems and the ends of the sensing vessel 28 through which they pass.

With reference to FIG. 1, the piston assembly 33 further comprises a piston control system 54 adapted to move the piston 34 from its first position to its second position in response to a designated system pressure. The piston control system 54 preferably comprises a sensing fluid path 56 interconnecting the source of system pressure 14 with the first fluid inlet 41 of the first chamber 40. The sensing fluid path 56 preferably comprises a pipeline or other fluid conduit interconnecting the first external port 48 with the source of system pressure 14. This pipeline or conduit communicates with the first fluid inlet 41 by means of the internal channel formed in the sensing vessel 30.

As shown in FIGS. 1-3, the piston control system 54 preferably further comprises a latch system 58 which is supported on a flange-like latch base 60 installed on the upper end of the sensing vessel 30. The latch base 60 is provided with a central axial opening (not shown) through which the second piston stem 46 may clearingly extend. The latch system 58 is characterized by a unreleased state (shown in FIG. 2), in which the latch system 58 prevents movement of the piston 34 to its second position, and a released state (shown in FIG. 3), in which the latch system permits such movement.

The latch system 58 preferably comprises at least one latch 62 which releasably engages the second piston stem 46, as shown in FIG. 2, so as to prevent movement of the piston 34 to its second position. Preferably, the latch system 58 comprises a plurality of latches 62, each supported on the latch base 60. Each of the plurality of latches 62 releasably engages the second piston stem 46, and each is preferably situated equidistantly from the second piston stem 46. In one preferred embodiment, the latch system 58 comprises an even number of such latches 62, such as two or four.

As best shown in FIGS. 2 and 3, each latch 62 preferably comprises a frame-like body 64 which is pivotally secured to the latch base 60 by a pin 66. Each latch 62 preferably comprises at least a stem roller 68 and a latch roller 70, each of which is rollingly supported on the body 64. The latch roller 70 is positioned on the opposite end of the body 64 from the pin 66, while the stem roller 68 is situated intermediate the pin 66 and the latch roller 70.

The latch system 58 is preferably biased toward the second piston stem 46. When the latch system 58 comprises an even number of opposed latches 62, as shown in FIGS. 1-3, this biasing is preferably accomplished by an extension spring (not shown) which links each opposing pair of latches 62 and pulls each latch 62 toward the second piston stem 46. Apart from this inward biasing feature, the latches 62 are functionally identical to those disclosed in U.S. Pat. No. 6,155,284, the entire disclosure of which is incorporated by reference.

As best shown in FIG. 3, the second piston stem 46 is preferably provided with an enlarged, tapering stem collar 72. When the piston 34 is in its first position, shown in FIG. 2, the tapered upper portion of the stem collar 72 is engaged by the underside of the stem roller 68 of each latch 62. The stem rollers 68 of each latch 62 thereby releasably engage the second piston stem 46 such that the piston 34 is prevented from moving to its second position.

The piston control system 54 preferably further comprises a biasing assembly 74, coupled to the piston 34 and disposed to oppose longitudinal movement of the piston 34 in the second direction 35. The biasing assembly 74 preferably comprises a biasing element 76, which is positioned within a housing, such as cage 78, which is in turn supported by a latch collar 80. The cage 78 and latch collar 80 are provided with central axial openings (not shown) through which the second piston stem 46 may clearingly extend. At its upper end 82, the second piston stem 46 engages the lower end of the biasing element 76, thereby coupling the piston 34 to the biasing element 76. In the embodiment shown in FIGS. 1–3, the biasing element 76 comprises a buckling pin.

As best shown in FIG. 3, the latch collar 80 is an H-shaped member having an upper flange 84, which engages the cage 78, and an opposed lower flange 86. The lower flange 86 of the latch collar 80 is engaged by the underside of the latch roller 70 of each latch 62. While engaged to the latch roller 70, the latch collar 60 accordingly cooperates with latch system 58 to prevent the cage 78 which houses the biasing element 76 from moving relative to the sensing vessel 30, while permitting limited longitudinal movement of the second piston stem 46.

The characteristics of the biasing element 76 are selected so that the biasing element 76 undergoes a designated deformation, such as buckling, whenever subjected to a longitudinal force which equals the force generated by applying the designated system pressure against the piston 34 in the first chamber 40. Once such a designated system pressure has been established in the first chamber 40, a longitudinal force sufficient to cause the biasing element 76 to undergo the designated deformation is transmitted to the biasing element 76, and it accordingly undergoes this deformation, as shown in FIG. 3.

With reference to FIG. 3, the tapered upper surface of the stem collar 72 of the second piston stem 46 undergoes an initial longitudinal movement in the second direction 35 as the biasing element 76 deforms. As a result of this movement, the stem roller 68 of each latch 62 rolls away from the second piston stem 46, causing the latch body 64 to pivot outwardly on the pin 66, as shown in FIG. 3. This pivoting movement causes the stem roller 68 of each latch 62 to disengage from the second piston stem 46 and the latch roller 70 of each latch 62 to disengage from the latch collar 80.

The stem collar 72 accordingly functions as a release mechanism, which causes the latch system 58 to disengage from the second piston stem 46, in response to the initial longitudinal movement of the second piston stem 46 permitted by the designated deformation of the biasing element 76. The latch system 58 is accordingly adapted to shift from its unreleased state to its released state in response to the designated deformation of the biasing element 76.

With the release of the latch system 58, the second piston stem 46 and its associated piston 34 may undergo further longitudinal movement in the second direction 35, beyond that initially permitted by the deformation of the biasing element 76. The piston 34 may accordingly move from its first position to its second position, shown in FIG. 3.

The latch system 58, which prevented longitudinal movement of the cage 78 in the second direction 35 while in its unreleased state, permits such longitudinal movement while in its released state. Thus, as the piston 34 moves to its second position, the biasing assembly 74, which has been released by the latch system 62, moves longitudinally in the second direction 35 together with the second piston stem 46.

Figures 4, 5, 6:
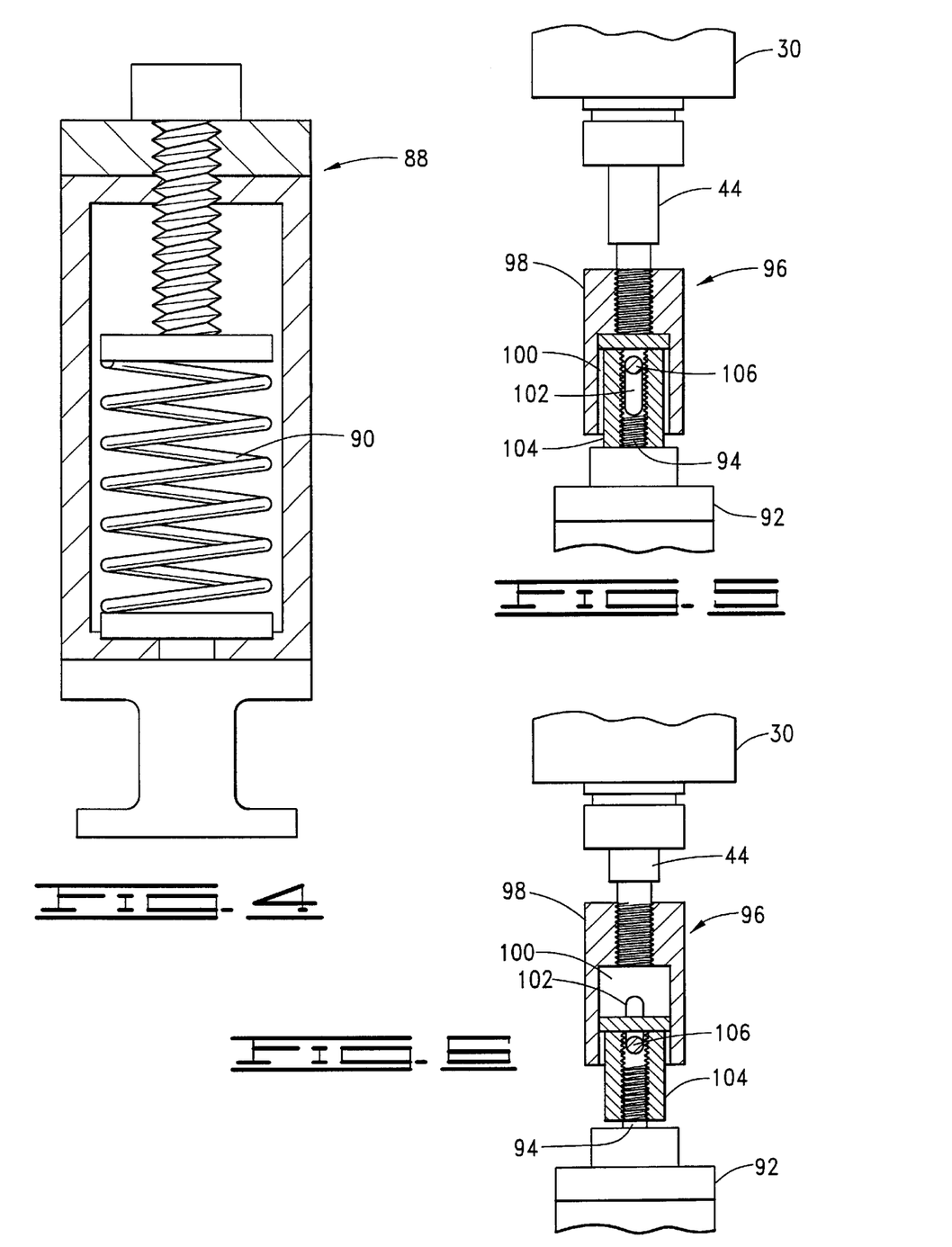
FIG. 4 is an side view, in partial cross-section. of an alternative biasing element for the system shown in FIGS. 1–3.
FIG. 5 is a side view, in partial cross-section, of the coupling assembly which links the actuator control valve to the first piston stem of the sensing assembly.
FIG. 6 is a side view, in partial cross-section, of the same coupling assembly shown in FIG. 5, in which the first piston stem has moved in a second direction, toward the sensing vessel.
Figure 6:
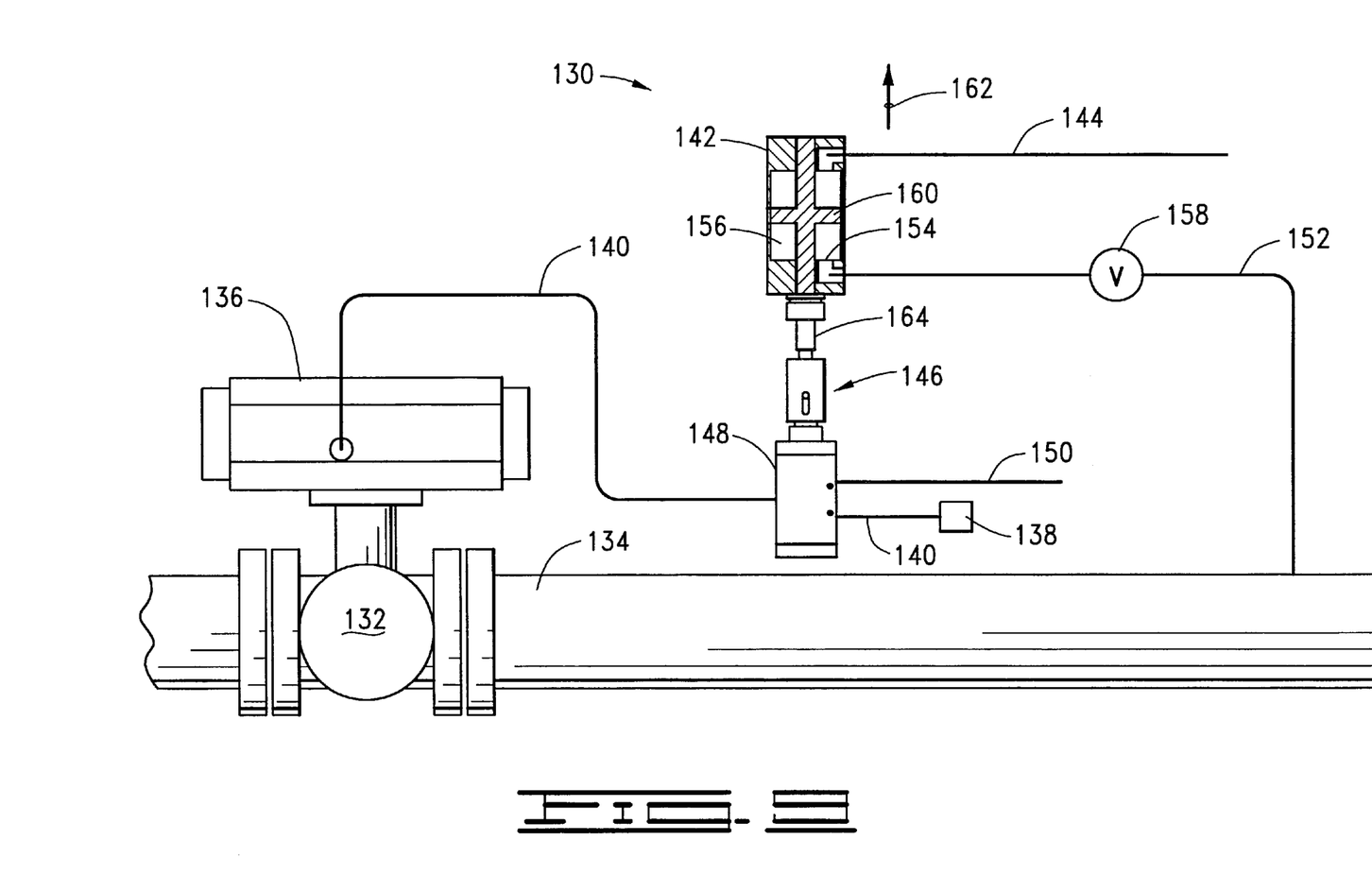

FIG. 4 shows another type of biasing assembly which may be used in the system of the present invention. This alternative biasing assembly 88 is essentially identical in construction to the biasing assembly 74 shown in the embodiment of FIGS. 1–3, with the exception of the biasing element. In the embodiment of Figure the biasing element 90 comprises a precision coil spring, rather than a buckling pin. The characteristics of the biasing element 90 are selected so that the biasing element 90 undergoes a designated deformation, in the form of a designated spring compression, whenever subjected to a longitudinal force which equals the force generated by applying the designated system pressure against the piston 34 in the first chamber 40.

With reference to FIGS. 1 and 2, the system 10 of the present invention further comprises an actuator control valve 92, which is secured to the support surface (not shown) by a bracket or other connector (not shown), such that the position of the actuator control valve 92 remains fixed in relation to that of the sensing vessel 32. As shown in FIGS. 5–8, the actuator control valve 92 has a stem 94 which is coupled to the first piston stem 44. The coupling between the stem 94 and the first piston stem 44 may comprise a direct coaxial connection between the two stems, or may include an intermediate lever mechanism (not shown) to produce a stroke for the actuator control valve of the required length, or to control the force applied to the actuator control valve 92.

In one embodiment of the present invention, shown in FIGS. 1–3 and in greater detail in FIGS. 5–6, the first piston stem 44, and thus the piston 34, are loosely coupled to the stem 94 of the actuator control valve 92. This loose coupling, generally designated by reference numeral 96, prevents relatively small movements of the first piston stem 44 from being transmitted to the stem 94 of the actuator control valve 92. Small changes in system pressure are routine in many systems, and will cause small movements of the first piston stem 44. The loose coupling between the stem 94 and first piston stem 44 assures that such small movements will not lead to premature actuation of the system valve 12.

With reference to FIGS. 5 and 6, the coupling 96 comprises a piston stem cylinder 98, which is secured to the lower end of the first piston stem 44, preferably by threads. A coaxial cylindrical internal cavity 100 is formed at the end of the first piston stem cylinder 98 opposite the first piston stem 44. A pair of opposed longitudinal slots 102, best shown in FIGS. 2 and 6, are formed in the wall of the piston stem cylinder 98, intermediate its ends, and communicate with the internal cavity 100.

The coupling 96 further comprises an actuator stem cylinder 104, which is secured to the stem 94 of the actuator control valve 92, preferably by threads. The actuator stem cylinder 104 is sized so as to be clearingly and coaxially receivable within the internal cavity 100 of the piston stem cylinder 98. A spring roll pin 106 is installed on the actuator stem cylinder 104, adjacent the end opposite the stem 94. The pin 106 extends across the internal cavity 100 and through both of the slots 102.

The coupling 96 permits the first end shaft 44 to move a distance equalling to the length of the slots 102 before such motion is transmitted to the actuator stem cylinder 104 and the stem 94, as illustrated in FIGS. 5 and 6. Any larger movement of the first end shaft 44 and piston 34 is transmitted to the stem 94 of the actuator control valve 92.

Figure 7:
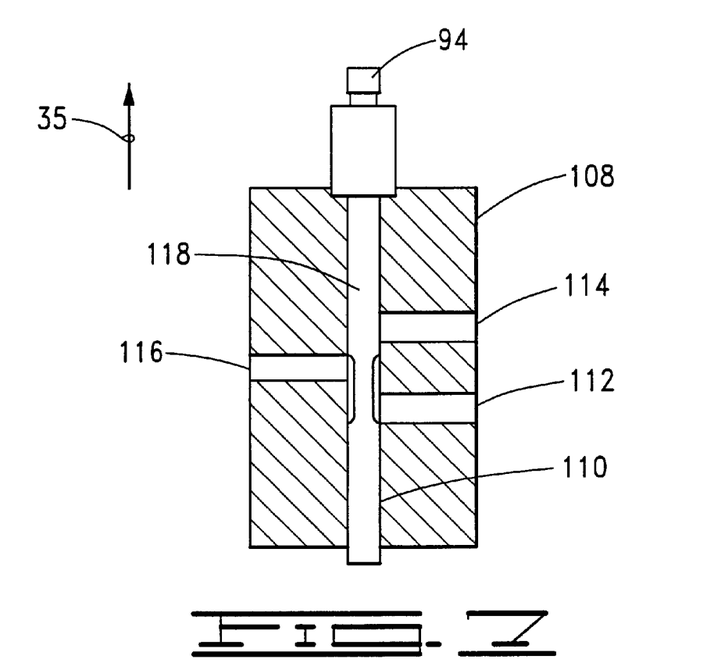
FIG. 7 is a side view, in partial cross-section, of the body of the actuator control valve, as it is configured in its first position. Flanges, seals and related valve hardware have been omitted for better display of other components.
Figure 8:
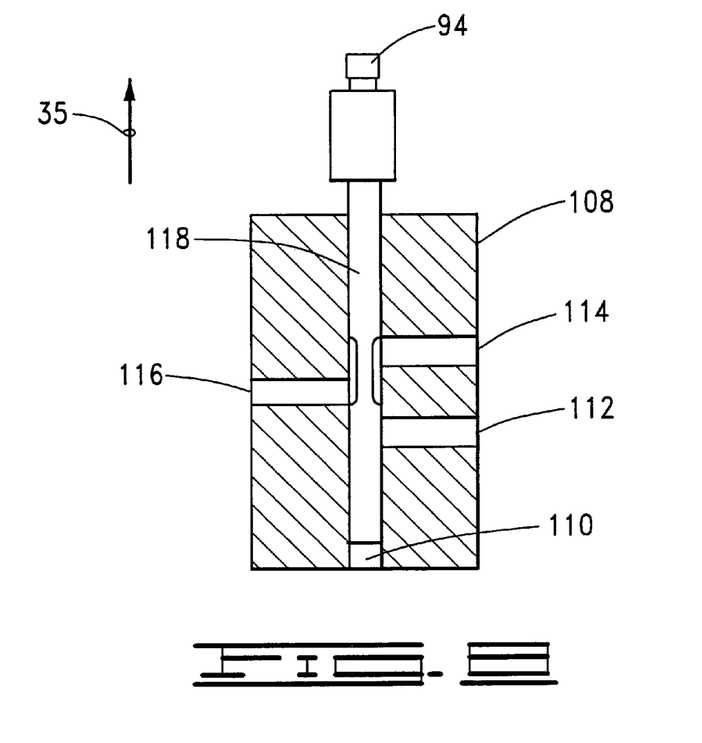
FIG. 8 is a side view, in partial cross-section, of the body of the same actuator control valve shown in FIG. 7, as configured in its second position.

With reference to FIGS. 7 and 8, the actuator control valve 92 is characterized by a first position and a second position, and preferably comprises a two-way spool valve. The actuator control valve 92 is characterized by a cylindrical body 108 having a coaxial longitudinal valve chamber 110 formed therein. Also formed in the valve body 108 are a pressure port 112, an adjacent exhaust port 114, and an opposed working port 116, each of which communicate with the valve chamber 110 by separate flow paths.

A cylindrical spool 118 having an annular groove 120 formed therein is received coaxially within the valve chamber 110. The spool 118 is longitudinally movable within the valve chamber 108 between a first position, corresponding to the first position of the actuator control valve 92, and a second position, corresponding to the second position of the actuator control valve 92. In the first position of the spool 118, shown in FIG. 7, the annular groove 120 interconnects the flow paths communicating with the pressure port 112 and the working port 116, while the flow path communicating with the exhaust port 114 is blocked. In the second position of the spool 118, shown in FIG. 8, the annular groove 120 interconnects the flow paths communicating with the exhaust port 114 and the working port 116, while the flow path communicating with the pressure port 112 is blocked. Seals (not shown) maintain fluid-tight separation between the spool 118 and the body 108.

The spool 118 is coaxially engaged with the stem 94 of the actuator control valve 92; alternatively, the spool 118 and stem 94 may be formed as a single integral component. As discussed above, the coupling between the first piston stem 44 and the stem 94 must be configured so that movement of the piston 34 from its first position to its second position produces a corresponding movement of the spool 118 from its first position to its second position. Thus, in the first position of the piston 34, a fluid connection is established between the pressure port 112 and the working port 116 of the actuator control valve 92. In the second position of the piston 34, a fluid connection is established between the working port 116 and the exhaust port 104 of the actuator control valve 92.

As shown in FIGS. 1–3, the actuator control valve 92 is interposed in the actuator fluid path 28, with connections at the pressure port 112 and the working port 116. Thus, when the actuator control valve 92 and the piston 34 are in their first positions, the actuator fluid path 28 is open, and permits communication between the actuator pressure source 24 and the actuator 22. On the other hand, when the actuator control valve 92 and the piston 34 are in their second positions, the actuator fluid path 28 is closed off in both directions at the actuator control valve 92.

The exhaust port 114 of the actuator control valve 92 is connected to an actuator exhaust fluid path 122, which may comprise a pipeline or other fluid conduit and which discharges to a fluid reservoir (not shown) or vents to the atmosphere. When the actuator exhaust fluid path 26 is blocked by shifting of the actuator control valve 92 to its second position, pressurized fluid at the actuator 22 will discharge, by way of the actuator control valve 92, into the actuator exhaust fluid path 122. This discharge results in a predetermined change in pressure at the actuator 22, normally comprising a drop in pressure. This predetermined change in pressure at the actuator 22 results from shift of the actuator control valve 92 to its second position, which in turn results from shift of the piston 34 to its second position.

The operation of the system 10 can be appreciated by reference to FIGS. 1–3. In the normal state of the system 10, the actuator control valve 92 is in its first position, such that the spool 118 engages the base of the actuator control valve 192 (as shown in FIG. 7), thereby maintaining the piston 34 in its first position, as shown in FIG. 2. In its first position, the actuator control valve 92 permits fluid communication, by way of the actuator fluid path 26, between the actuator pressure source 24 and the actuator 22. Actuator 22 is thereby maintained its unactuated state, and its associated system valve 12 accordingly remains in its first system valve position.

System pressure within the source of system pressure 14 is monitored at the piston 34 by way of the sensing fluid path 56. When the designated system pressure is reached within the first chamber 40, the force exerted against the piston 34 is sufficient to cause deformation of the biasing element 76, as shown in FIG. 3. This deformation causes the latch system 58 to shift to its released state, and system pressure then causes the piston 34 to move to its second position.

Movement of the piston 34 to its second position is transmitted, by way of first piston stem 44, coupling 96 and stem 92, to the spool 118 of the actuator control valve 92, which is thereby caused to move from its first position to its second position. When the actuator control valve 92 shifts from its first position to its second position, a predetermined change in pressure occurs at the actuator 22, causing the actuator 22 to shift from its unactuated state to its actuated state. This transition of the actuator 22 in turn causes the system valve 12 to shift from its first system valve position to its second system valve position.

The system 10 makes use of the system pressure 14, monitored by the sensing assembly 30, to control the actuator 22, and accordingly does not require electrical signals for control. Transient power outages, which may result from lightning strikes or electrical system surges, thus do not cause actuation of the system valve 12: actuation occurs only if and when the designated system pressure is reached with the source 14. The system 10 requires no outside power source (other than that required for the actuator 22), and can function as a self-contained system.

Preferably, the system 10 is configured so that it will not be self-resetting once the piston 34 has shifted to its second position. Safe operating conditions in the source 14 can be accordingly be confirmed before the system 10 is returned to service.

FIG. 9 shows another embodiment of an actuator system 130 for a system valve 132 exposed to a source of system pressure 134. The system 130 includes an actuator 136, actuator pressure source 138, actuator fluid path 140, sensing vessel 142, piston 160, chamber exhaust fluid path 144, sensing fluid path 145, coupling 146, actuator control valve 148, and actuator exhaust fluid path 150. These components are preferably constructed and configured identically to the corresponding components described with reference to the embodiment of FIGS. 1–8.

As with the embodiment of FIGS. 1–8, the system 130 includes a sensing fluid path 152 interconnecting the source of system pressure 134 with the first fluid inlet 154 of the first chamber 156. However, the system 130 does not include either a biasing assembly or a latch system of the type disclosed in the embodiment of FIGS. 1–8. Instead, a normally closed pressure relief valve 158 is interposed in the sensing fluid path 152. The characteristics of the pressure relief valve 158 are selected such that it is disposed to open at the designated system pressure.

The pressure relief valve 158 preferably comprises a nonreclosing valve. Valves suitable for use as a pressure relief valve 158 include a rupture disc assembly, an inline buckling pin valve, and an angle body buckling pin valve. Also suitable for use as a pressure relief valve is a buckling pin latch valve, such as that disclosed in U.S. Pat. No. 6,155,284.

In the normal state of the system 130, the actuator control valve 148 is in its first position, such that the spool of the actuator control valve 148 engages its base, thereby maintaining the piston 160 in its first position, as shown in FIG. 9. In its first position, the actuator control valve 148 permits fluid communication, by way of the actuator fluid path 140, between the actuator pressure source 138 and the actuator 136. Actuator 136 is thereby maintained its unactuated state, and its associated system valve 132 accordingly remains in its first system valve position.

System pressure within the source of system pressure 134 is monitored at the pressure relief valve 158 by way of the sensing fluid path 152. When the designated system pressure is reached within the source of system pressure 134, the pressure relief valve 158 opens, thereby exposing the first chamber 156 to the designated system pressure. This system pressure causes the piston 160 to move in second direction 162 to its second position.

Movement of the piston 160 to its second position is transmitted, by way of first piston stem 164 and coupling 146, to the spool of the actuator control valve 148, which is thereby caused to move from its first position to its second position. When the actuator control valve 148 shifts from its first position to its second position, a predetermined change in pressure occurs at the actuator 136, causing the actuator 136 to shift from its unactuated state to its actuated state. This transition of the actuator 136 in turn causes the system valve 132 to shift from its first system valve position to its second system valve position.

Changes may be made in the construction, operation and arrangement of the various parts, elements, steps and procedures described herein without departing from the spirit and scope of the invention as defined in the following claims.

What is claimed is:

1. An actuator system for a system valve exposable to a source of system pressure comprising:
   a sensing assembly, comprising:
      a sensing vessel having a tubular internal cavity;
      a piston assembly comprising:
         a piston positioned within the internal cavity, the piston having at least a first position and a second position, longitudinally offset from the first position in a second direction;
         a piston control system adapted to move the piston from its first position to its second position in response to a designated system pressure, comprising:
            a sensing fluid path interconnecting the source of system pressure with the internal cavity of the sensing vessel;
            a biasing element, coupled to the piston and disposed to oppose longitudinal movement of the piston in the second direction, the biasing element adapted to undergo a designated deformation once such designated system pressure is established within the internal cavity; and
            a latch system having a unreleased state, in which the latch system prevents movement of the piston to its second position, and a released state, in which the latch system permits such movement, wherein the latch system is adapted to shift from its unreleased state to its released state in response to the designated deformation of the biasing element;
   an actuator, adapted for engagement with the system valve, the actuator adapted to shift from an unactuated state to an actuated state in response to a predetermined change in pressure at the actuator;
   an actuator pressure source interconnectable with the actuator by an actuator fluid path; and
   an actuator control valve interposed in the actuator fluid path, the actuator control valve coupled to the piston and producing the predetermined change in pressure at the actuator in response to movement of the piston from its first to its second position.

2. The system of claim 1 in which the piston assembly further comprises a piston stem engaged with the piston, in which the latch system engages the piston stem in its unreleased state, in which the designated deformation of the biasing element results in an initial longitudinal movement of the piston stem in the second direction, and in which the latch system disengages the piston stem in response to such initial longitudinal movement.

3. The system of claim 1 in which the biasing element is supported in a housing, and in which the latch system prevents longitudinal movement of the housing in the second direction while in its unreleased state, and permits such longitudinal movement while in its released state.

4. The system of claim 1 in which the biasing element comprises a precision spring.

5. The system of claim 1 in which the actuator control valve is a spool valve.

6. The system of claim 1 in which the piston is loosely coupled to the actuator control valve.

7. The system of claim 1 in which the biasing element comprises a buckling pin.

8. A control system for an actuator engageable with a system valve exposable to a source of system pressure, the actuator interconnectable with an actuator pressure source by an actuator fluid path and adapted to shift from an unactuated state to an actuated state in response to a predetermined change in pressure at the actuator, comprising:
   a sensing assembly, comprising:
      a sensing vessel having a tubular internal cavity;
      a piston assembly comprising:
         a piston positioned within the internal cavity, the piston having at least a first position and a second position, longitudinally offset from the first position in a second direction;
         a piston control system adapted to move the piston from its first position to its second position in response to a designated system pressure, comprising:
            a sensing fluid oath interconnecting the source of system pressure with the internal cavity of the sensing vessel;
            a biasing element, coupled to the piston and disposed to oppose longitudinal movement of the piston in the second direction, the biasing element adapted to undergo a designated deformation once such designated system pressure is established within the internal cavity; and
            a latch system having a unreleased state, in which the latch system prevents movement of the piston to its second position, and a released state, in which the latch system permits such movement, wherein the latch system is adapted to shift from its unreleased state to its released state in response to the designated deformation of the biasing element;

an actuator control valve interposable in the actuator fluid path, the actuator control valve coupled to the piston and producing the predetermined change in pressure at the actuator in response to movement of the piston from its first to its second position.

9. The system of claim 8 in which the piston assembly further comprises a piston stem engaged with the piston, in which the latch system engages the piston stem in its unreleased state, in which the designated deformation of the biasing element results in an initial longitudinal movement of the piston stem in the second direction, and in which the latch system disengages the piston stem in response to such initial longitudinal movement.

10. The system of claim 8 in which the biasing element is supported in a housing, and in which the latch system prevents longitudinal movement of the housing in the second direction while in its unreleased state, and permits such longitudinal movement while in its released state.

11. The system of claim 8 in which the biasing element comprises a precision spring.

12. The system of claim 8 in which the actuator control valve is a spool valve.

13. The system of claim 8 in which the piston is loosely coupled to the actuator control valve.

14. The system of claim 8 in which the biasing element comprises a buckling pin.

15. An actuator system for a system valve exposable to a source of system pressure comprising:

a sensing assembly, comprising:
  a sensing vessel having a tubular internal cavity;
  a piston assembly comprising:
    a piston positioned within the internal cavity, the piston having at least a first position and a second position, longitudinally offset from the first position in a second direction; and
    a piston control system adapted to move the piston from its first position to its second position in response to a designated system pressure; and an actuator, adapted for engagement with the system valve, the actuator adapted to shift from an unactuated state to an actuated state in response to a predetermined change in pressure at the actuator;

an actuator pressure source interconnectable with the actuator by an actuator fluid path; and an actuator control valve interposed in the actuator fluid path, the actuator control valve loosely coupled to the piston and producing the predetermined change in pressure at the actuator in response to movement of the piston from its first to its second position.

16. A control system for an actuator engageable with a system valve exposable to a source of system pressure, the actuator interconnectable with an actuator pressure source by an actuator fluid path and adapted to shift from an unactuated state to an actuated state in response to a predetermined change in pressure at the actuator, comprising:

a sensing assembly, comprising:
  a sensing vessel having a tubular internal cavity;
  a piston assembly comprising:
    a piston positioned within the internal cavity, the piston having at least a first position and a second position, longitudinally offset from the first position in a second direction; and
    a piston control system adapted to move the piston from its first position to its second position in response to a designated system pressure; and an actuator control valve interposable in the actuator fluid path, the actuator control valve loosely coupled to the piston and producing the predetermined change in pressure at the actuator in response to movement of the piston from its first to its second position.

* * * * *